Patented Mar. 19, 1940

2,194,121

UNITED STATES PATENT OFFICE 2,194,121

CATIVYL ALCOHOL AND METHOD OF PREPARING IT

Nicholas L. Kalman, Cambridge, Mass., assignor to Arthur D. Little, Incorporated, Cambridge, Mass., a corporation of Massachusetts No Drawing. Original application October 15, 1936, Serial No. 105,697. Divided and this application June 11, 1937, Serial No. 147,735

5 Claims. (Cl. 260—617)

This invention relates to a new organic alcohol, and to methods of preparing it.

This application is a division of my co-pending application, Serial No. 105,697, filed October 15, 1936, now U. S. Patent No. 2,152,743.

The raw material used as a source of the new organic alcohol and related compounds described herein is the exudate from the species of the tree called *Prioria copaifera*, Gris., which tree is found abundantly in parts of tropical and semi-tropical countries,—for example, along the Caribbean coast of Panama and Costa Rica. The exudate is properly called Cativo resin, although it is also commonly called Cativa (or Cateva or Catteva) balsam, and also by various local names. The natural exudate is usually a greenish brown, very tacky and viscous, opaque liquid, and has especially when heated, an unpleasant odor. Attempts to use it commercially have heretofore been without success.

I have found that about 70 to 80% of this resin exudate is in the form of an organic acid. This acid is not readily secured by ordinary methods of procedure without considerable contamination with other ingredients, and with by-products which result from the methods of treating. To this acid, which I have succeeded in obtaining in pure state for the first time, I have given the name "Cativic acid."

Cativo resin contains as a rule about ½% water, 0.1% ash, up to 2% volatile oil, and about ½% of an unidentified acid which has a very much lower boiling point than cativic acid. The two major constituents of Cativo resin are cativic acid, as mentioned above, which makes up about 70 to 80% of the resin, and another substance which makes up about 15 to 25% of the resin. This latter substance I have found to be an ester of cativic acid with its corresponding alcohol, and have accordingly named it "Cativyl cativate." The said corresponding alcohol I have prepared for the first time and have given it the name "Cativyl alcohol."

In order that this invention may be fully understood, I will describe cativic acid and methods of making it, as well as cativyl alcohol and methods for its preparation. Furthermore, the processes for producing cativic acid yield cativyl alcohol, or cativyl cativate, which latter may then be used for preparing cativyl alcohol; hence are properly set forth in sufficient detail herein. The aspects of preparing cativic acid, and cativic acid itself, are claimed in the co-pending application, Serial No. 105,697, already referred to.

Cativic acid is a very viscous and tacky substance; it is a semi-solid having a cold flow, and is colorless or substantially so, and nearly entirely odorless. All attempts at crystallization of this material have so far failed, and as in the case of similar high molecular weight non-crystallized and oxidizable organic acids, it is a very difficult matter to establish a precise chemical formula and absolute physical and chemical characteristics. It appears, however, to be a definite chemical compound, which may exist in one form or as a mixture of isomeric forms all having the same molecular formula, set forth below. Closely related compounds (having, for example, 2 carbon atoms more,—or less) may be present in traces; these would be practically impossible to isolate and identify. This chemical compound, which may or may not be present in isomeric form, I refer to as cativic acid. A series of combustions on samples of purified cativic acid give a mean of carbon 78.41%, and hydrogen 11.06%. This corresponds to a molecular formula of $C_{20}H_{34}O_2$. It will be readily apparent that the exact molecular formula of a substance having such a high molecular weight is not easy to determine. Hence this formula is advanced as being the most probable as far as I have been able to ascertain. The mean acid number is found to be 183.3. Cativic acid has an unsaturated bond, but the iodine number determinations according to Wij's method yield varying data according to the amount of sample taken, time of reaction, etc. Representative samples of purified cativic acid show an average refractive index of 1.509 at 24° C.; a specific gravity of 0.9987 at 23° C.; a viscosity, 100 cc. pipette at 22° C., of 78.5 hours; water under same conditions, 11.6 seconds.

Cativic acid exhibits the properties of a monobasic acid, readily forming salts. It also readily forms esters, differing from abietic and other resin acids which esterify only with difficulty. Its composition in conjunction with the degree of unsaturation clearly differentiates it from the aliphatic acids. With a body of as high molecular magnitude as cativic acid, a small variation in percentage composition of hydrogen, oxygen, and carbon produces a correspondingly greater apparent variation in composition, but from my researches, there is no compound of this composition or closely approaching the same which has the characteristics indicated above and the ability of ready esterification.

Cativic acid is insoluble in water, but soluble in all the common organic solvents including generally aliphatic or aromatic hydrocarbons, alcohols, ketones, esters, ethers, chlorinated solvents, etc.

Among the methods which I have used for obtaining cativic acid I will describe a distillation process, various types of neutralization processes, and a solvent process. While I will describe each process in considerable detail, in order that they may be readily followed and carried out, it should be definitely understood that many modifications are possible, and the invention is limited only by the scope of the appended claims.

In carrying out the distillation process, I may first filter the Cativo resin (which is advantageously warmed or dissolved in a suitable solvent, to improve its flow) in order to remove dirt and other foreign matter. This step, however, is not necessary. Then I subject it to heat and preferably to a slight vacuum, equal, say, to a pressure of 200 mm. of mercury, thereby driving off water and other low-boiling constituents. The pressure during this step may vary considerably. The remaining constituents,—cativic acid and cativyl cativate—do not distill while the temperature is below about 200° C., even at a low absolute pressure. (Pressures, in this specification, are given in millimeters of mercury, and are absolute pressures.) The receiver is now changed, and on raising the temperature to above 200° C., with a low pressure (below 10 mm. preferably), cativic acid is distilled off, leaving cativyl cativate as the residue. Care should be taken, during the distillation, to keep the pressure low; with higher pressures (e. g. 10 mm. or over) there is a tendency for cativic acid to lose $CO_2$, forming the corresponding hydrocarbon which I call Cativene. (Cativene is a substantially colorless, thin liquid, boiling at about 160° C. at 3 mm. It is readily obtained by distilling cativic acid-containing material at a temperature and pressure such that cativene is produced by the breakdown of cativic acid, the pressure being too high (or, in other words, the vacuum being too low), and simultaneously, the temperature being too low, to distill off cativic acid itself,—for example, a pressure of 100 mm. at about 200° C. is suitable. Cativene appears to have the molecular formula of cativic acid minus $CO_2$, and also perhaps minus two atoms of hydrogen). However, once the distillation of cativic acid is well under way, at the indicated low pressure, there is little or no further trouble from cativene formation, and any cativene which came over early in the distillation may be separated by simultaneous or subsequent fractional distillation or by neutralization of the cativic acid, or by other suitable means. As cativyl cativate does not distill or decompose under the conditions mentioned above, there is a sharp break in the distillation when cativic acid has been distilled over, the cativyl cativate remaining behind as a residue. When separating by neutralization, an alkali such as caustic soda together with a suitable solvent such as water is used, and the cativic acid separated from the other materials including cativene, in the same general way as outlined below under the neutralization process. There is also some tendency for cativic acid and its derivatives to oxidize especially at elevated temperatures where progressive discoloration also takes place. This can be avoided by distilling in the absence of oxygen,—e. g. in an atmosphere of nitrogen or carbon dioxide, etc. The cativyl cativate left behind as a residue may then be worked up by procedures hereinafter described for the production of cativyl alcohol.

In carrying out the neutralization processes, I treat Cativo resin, or other material from which cativic acid is to be removed, with a suitable compound of a metal or of ammonia, or with an organic base or alcohol—for example, with sodium oxide or hydroxide, ammonium hydroxide, or various metallic oxides, carbonates, acetates, or other salts thereof—in other words, an organic or inorganic compound having a basic reaction—whereby to form the metal salt or organic base salt, or an ester of cativic acid ("metal" here includes ammonium). The salt (or ester) is then treated to recover cativic acid therefrom. There are two aspects to the neutralization treatment, one, where the cativic acid alone, is reacted with the basic compound, and the other, where also the cativyl cativate, when present, is saponified by an excess of the basic compound over that required to react with the cativic acid alone. In this latter aspect, cativyl cativate reacts to form two products,—salt (or ester) of cativic acid with the base (or the added alcohol), and cativyl alcohol. Hence, when saponification of cativyl cativate accompanies neutralization of cativic acid, cativyl alcohol is a by-product in the manufacture of cativic acid. Of course, procedures of partial saponification, intermediate the two aspects of the neutralization treatment just described, may be practiced. These neutralization processes therefore commonly result in the production of cativyl alcohol directly, or of cativyl cativate, which latter may then be used in the preparation of cativyl alcohol, as will be described later herein.

The various neutralization processes, which may or may not include saponification as set forth above, may be conveniently classified as follows:

(1) Recovery of cativic acid from its water-soluble salts in solution.

(2) Recovery of cativic acid from its water-soluble salts after drying the latter.

(3) Recovery of cativic acid from its dry ammonium salt.

(4) Recovery of cativic acid from its water-soluble salts separated from acetone solution.

(5) Recovery of cativic acid by the use of relatively high-boiling organic solvents.

(6) Recovery of cativic acid by first preparing esters thereof (as by the procedure disclosed in my co-pending application, Serial No. 33,661, filed July 29, 1935, now U. S. Patent No. 2,152,741) and subsequently decomposing the resulting esters, as by hydrolysis. The necessary procedure for this will be clear from the disclosure herein and in S. N. 33,661, and need not be further discussed.

Taking these up now in order, I will describe each one in detail.

By the first of the above-numbered neutralization processes for obtaining cativic acid I may proceed to obtain all the cativic acid contained in Cativo resin or other starting material, whether present as such, or combined with cativyl alcohol as cativyl cativate. A simple procedure is to heat or boil the Cativo resin with an aqueous (or alcoholic, or aqueous-alcoholic) caustic solution, whereby the cativyl cativate is easily saponified. Alternatively, no heat may be applied, less alkali may be used, and correspondingly less, or no, cativyl cativate saponified. All of the resin, except for a small amount of dirt and like impurities, which are readily removed by filtration, is now in solution. Dilution, at least to a considerable degree, of this solution with water is possible, without apparent precipitation—the cativyl alcohol being undoubtedly held by the soap solution. To separate these ingredients, the soap solution is shaken out with a solvent immiscible with water or the alkali cativate. Petroleum ether or ethyl ether may be used as such a solvent. The cativyl alcohol is thus dissolved out in the solvent phase, and may be recovered as desired. The alkali cativate, contained in the other phase, may be decomposed (hydrolyzed) in well-known manner by addition of a comparatively strong acid, whereby cativic acid is produced. Catavic acid may then be readily separated from the other materials, which exist as a water solution of alkali salt, alcohol (if any has been used), and any excess of the strong acid,—since cativic acid is insoluble therein at the relatively high water-content then existing in said solution.

In carrying out the second of the above-numbered neutralization processes, I take Cativo resin, or other substance containing cativic acid, with or without cativyl cativate, and neutralize (or saponify more or less, as desired) with aqueous, or alcoholic, or aqueous-alcoholic alkali solution,—or with solid alkali,—in the presence or absence of inert material, and then evaporate to dryness. The dry material is then extracted with a solvent, such as acetone, which extracts the impurities (cativyl cativate, cativyl alcohol, cativene, ethereal oil, etc.), but has no effect, or substantially none, on the alkali salt of cativic acid. The thus-purified salt of cativic acid is then decomposed, as by hydrolysis with a strong acid, and the cativic acid thus recovered therefrom. This salt will, when Cativo is used as the raw material, necessarily contain the salt of the other acid present to the extent of about ½ of 1% in natural Cativo. This acid may be removed, prior to the above treatment, by fractional distillation as already described, or by heating the mixture of this acid and cativic acid (after the hydrolysis step) to about 100° C. at 7 mm., preferably in a non-oxidizing atmosphere, the impurities distilling over and leaving the pure cativic acid behind.

The third neutralization process listed above is conveniently carried out by dissolving Cativo resin, or other cativic acid-containing material, in say three times its weight of petroleum ether, filtering if desired, and then leading anhydrous ammonia into the solution. This procedure may be simply neutralization, or neutralization with saponification of any cativyl cativate present. The ammonium salt of cativic acid precipitates out as a gummy solid, and the supernatant petroleum ether, containing the other constituents and by-products, is readily removed as by decantation. The resulting ammonium cativate may be purified as desired by washing with petroleum ether. If it is necessary to further purify the ammonium cativate, for itself or as a source of cativic acid, it may be decomposed (hydrolyzed) by a strong acid, such as hydrochloric or sulfuric, and the resulting cativic acid taken up in petroleum ether; this solution, after treatment to remove water (as by subjecting to a water-absorbing agent inert to the ingredients), is then again ammoniated. The impurities will now be found in the petroleum ether layer, and the pure solid gummy ammonium cativate may be used as such or hydrolyzed as described above to produce cativic acid. Another method of recovering cativic acid from ammonium cativate consists in heating the latter, as on a water-bath, whereby anhydrous ammonia is given off and may be recovered for reuse, and cativic acid remains in pure form. This is preferably carried out in a non-oxidizing atmosphere.

In carrying out the fourth of the above-itemized neutralization processes, I dissolve a cativic acid-containing material in acetone, and treat the acetone solution with a concentrated aqueous solution of alkali. It is evident that whether there will be neutralization only, or saponification as well, depends upon the relative amounts of alkali, and also upon the temperature and length of treatment. The alkali salt of cativic acid resulting from this procedure will be in the aqueous layer, while the other organic components, such as cativyl alcohol, cativyl cativate, cativene, etc. will be found in the acetone layer. The two layers may be separated, and the purified cativic acid in the form of its salts segregated from the other components. The salt may then be used as a source of pure cativic acid, in accordance with methods elsewhere described herein.

My fifth method of preparing pure cativic acid by the neutralization procedure consists in heating Cativo or other suitable cativic acid-containing material in a high-boiling solvent with some metallic oxides, hydroxides, carbonates, acetates, and the like, preferably in a finely-divided state and with stirring; cativic acid thus combines with the base, forming the corresponding salt. For instance, 70 parts of impure cativic acid is heated with 30 parts of a high-boiling petroleum hydrocarbon, boiling at, say, 160° C., to about 125–135° C. Then the calculated amount of litharge is added, preferably gradually, the water of reaction boiling off, and the lead cativate dissolving in the high-boiling petroleum hydrocarbon. It is advantageous to filter at this point. The lead cativate solution, containing cativyl alcohol, cativyl cativate, or cativene, as the case may be, is either evaporated to dryness, and then the impurities dissolved therefrom with a selective solvent, or the solution is diluted with such a selective solvent, thereby precipitating the salt of cativic acid, which is subsequently washed with a non-solvent for the salt. The impurities are recovered from the solvents by any of the usual methods, while the cativate salt is dried, and utilized as such, or may be decomposed with or without previous drying, into cativic acid, in the manner already described. As usual, an inert, non-oxidizing atmosphere is advantageously used.

In carrying out the solvent process for obtaining cativic acid, the Cativo resin is first treated with aqueous alcohol containing approximately 75% alcohol; cativic acid goes into solution but the undesirable impurities and other ingredients remain as a bottom sludge. The alcoholic-aqueous solution may be poured off or filtered, and cativic acid may be recovered therefrom in several ways. For instance, the alcohol solution may be distilled or diluted until the alcohol content is about 50% or less, in which mixture cativic acid becomes thereby substantially insoluble, and the acid thus separated may be, if so desired, taken up by a solvent immiscible with the 50% aqueous alcoholic solution, such as petroleum ether or other aliphatic hydrocarbons, and thus separated. Cativic acid then may be recovered by evaporation of the solvent, preferably in a non-oxidizing atmosphere. Or, the 75% alcoholic solution may be shaken out with an immiscible solvent such as certain aliphatic hydrocarbons, e. g. "Varnoline", part of cativic acid going into the hydrocarbon solution. After the separation of the solvent, the 75% alcoholic solution containing some cativic acid may be used again for extraction of another portion of Cativo resin, and so on, and the solution freed from the solvent if so desired, and cativic acid then obtained. Or, the solution may be used as such. The 75% alcoholic solution may be decolorized, or substantially so, if so desired, by adding sodium hydrosulphite in the amount of .2% of the total weight, shaking out for a while, possibly gently heating, and preferably filtering. Decolorization of color-imparting constituents of cativic acid may also be accomplished by sunlight, or by sources of suitable artificial light which has an excellent decolorizing effect thereon, especially in solution.

Cativyl alcohol is a practically colorless, viscous liquid, having a slight sweetish odor, and boiling at 209° C. at 4½ mm. Representative samples of purified cativyl alcohol show a specific gravity at 27° C. of 0.9784, and a viscosity at 26° C., as determined by relative time of outflow from a burette, of 117.5 times that of water. Careful examination of cativyl alcohol shows it to be the alcohol corresponding to cativic acid, and that the molecular formula is accordingly $C_{20}H_{36}O$. This is advanced as the most probable formula so far as I have been able to ascertain; the difficulty of determining the exact formula of a substance having so large a molecule is readily evident, and the statements made hereinbefore with respect to ascertaining the formula of cativic acid apply similarly to cativyl alcohol.

Various methods for preparing cativyl alcohol have already been described, in connection with the several neutralization processes for the production of cativic acid.

Alternatively, cativyl alcohol may be prepared from Cativo resin, or from cativyl cativate alone or in mixtures with other materials,—for example, the residues (chiefly cativyl cativate) obtained by the distillation or the solvent processes described above for making cativic acid. Methods for this have already been pointed out herein. Thus, the cativyl cativate may be saponified and the two resulting materials separated,—one of these being cativyl alcohol and the other the soap or salt of cativic acid. Methods of separation are clear from the foregoing disclosure.

Another method of preparing cativyl alcohol is to heat cativyl cativate (or a suitable material containing it) in a high vacuum, with a compound having one or several esterifiable —OH groups, the heating being carried on at a temperature above the boiling point of cativyl alcohol. Alcoholysis takes place, the higher-boiling alcohol replacing cativyl alcohol which is thus freed and may be readily removed by distillation at the proper temperature and pressure.

Cativyl alcohol may be also prepared from a material containing cativyl cativate, by saponifying cativyl cativate, evaporating to dryness, and vacuum-distilling cativyl alcohol, whereby the salt of cativic acid remains behind. If the other low-boiling constituents of Cativo have been previously removed, according to some of the methods indicated above, or if they are fractionated during this procedure by distilling them at their much lower boiling points, pure cativyl alcohol may thus be easily obtained. But this method is liable to furnish cativic acid of less purity than those obtained by the other methods, due to the fact, that the cativic salt is liable to retain some cativyl alcohol. Of course, here also, as in all other operations, where some cativic product is subjected to elevated temperatures, the employment of an inert, non-oxidizing atmosphere is advantageous.

As far as I am aware, I am the first to prepare cativyl alcohol, or even to recognize that such a compound can be prepared. It is now possible, following the methods herein set forth, to prepare cativyl alcohol readily and conveniently, and to prepare it in as pure a form as may be desired.

While certain specific examples of this invention have been described herein above by way of illustration, it is to be understood that this has been done for the purpose of affording an understanding of this invention and the scope of this invention is not to be limited thereby, but is to be limited only by the language of the following claims.

I claim:

1. As a new compound, cativyl alcohol, being the alcohol corresponding to the alcohol radical of the principal ester constituent of Cativo resin.

2. As a new compound, cativyl alcohol, being a practically colorless, viscous liquid, boiling at 209° C. at 4½ millimeters of mercury pressure, absolute.

3. Method of preparing cativyl alcohol, comprising reacting a material comprising cativyl cativate with a metal compound having a basic reaction, said compound being of the class consisting of metal oxides and hydroxides and salts of relatively strong metal hydroxides with relatively weak acids, whereby to form a metal cativate and cativyl alcohol.

4. Method of preparing cativyl alcohol comprising saponifying cativyl cativate, and then distilling off the cativyl alcohol produced by the saponification.

5. Method of preparing cativyl alcohol comprising saponifying cativyl cativate, and then extracting by means of a solvent the cativyl alcohol produced by the saponification.

NICHOLAS L. KALMAN.